United States Patent [19]

Anderson et al.

[11] Patent Number: 4,933,236
[45] Date of Patent: Jun. 12, 1990

[54] POLYESTER YARN AND ADHESIVELY ACTIVATED WITH A QUATERNARY AMMONIUM SALT OF A POLYEPOXIDE

[75] Inventors: Norman S. Anderson, Charlotte, N.C.; Gunilla E. Gillberg-La Force, Summit, N.J.; Edward J. Powers, Charlotte, N.C.; Anthony W. Yankowsky, Fort Mill, S.C.

[73] Assignee: Celanese Corporation, New York, N.Y.

[21] Appl. No.: 95,186

[22] Filed: Sep. 11, 1987

Related U.S. Application Data

[62] Division of Ser. No. 877,627, Jun. 23, 1986.

[51] Int. Cl.$^5$ .............................................. B32B 27/36
[52] U.S. Cl. ..................................... 428/395; 156/910; 427/386
[58] Field of Search .......................... 428/395; 525/438; 156/320, 910; 427/386

[56] References Cited

U.S. PATENT DOCUMENTS

| 3,395,107 | 6/1968 | Burnthall et al. | 428/395 |
| 3,634,117 | 1/1972 | Wegerhoff et al. | 428/395 |
| 3,738,864 | 6/1973 | Altau | 428/395 |
| 3,775,150 | 11/1973 | McClary | 428/395 |
| 4,388,372 | 6/1983 | Champaneria et al. | 428/395 |
| 4,557,967 | 12/1985 | Willemsen et al. | 428/395 |

FOREIGN PATENT DOCUMENTS 1174476  8/1986  Japan ................................. 525/438

*Primary Examiner*—John C. Bleutge
*Assistant Examiner*—David W. Woodward
*Attorney, Agent, or Firm*—Forrest D. Stine

[57] ABSTRACT

A composition for the adhesive activation of polymeric material. The composition is comprised of a non-resinous quaternary ammonium salt of a polyepoxide wherein the nitrogen atom of the ammonium group is bonded directly to a carbon atom of the polyepoxide and wherein the composition is substantially free of free amine. The composition may be used as a spin finish or topcoat composition and is particularly useful in the preparation of polyethylene terephthalate tire cord which is ultimately incorporated into rubber.

12 Claims, No Drawings

POLYESTER YARN AND ADHESIVELY ACTIVATED WITH A QUATERNARY AMMONIUM SALT OF A POLYEPOXIDE

This is a division of application Ser. No. 877,627 filed June 23, 1986.

BACKGROUND OF THE INVENTION

FIELD OF THE INVENTION

The present invention relates to a composition for adhesive activating polymeric material, especially polyester material, such as multifilament polyester industrial yarn, which is suitable for industrial use in applications exemplified by pneumatic tires. The present invention also relates to a process for treating polymeric material with an adhesive activating composition and the polymeric material which is adhesive activated by the composition.

DESCRIPTION OF THE PRIOR ART

Polyester fibers, cords, fabrics and other multifilament materials are used extensively for reinforcing rubber articles such as tires, belts, hoses and the like. Unfortunately, polyester materials generally adhere poorly to rubber unless first treated to improve adhesion, such as by coating. Due to the exceptional strength and reinforcing ability of polyester fibers, there has been a continuous effort to improve the adhesion of polyesters to rubber. A widely used process for adhering polyester to rubber involves coating polyester with an RFL latex which contains a resorcinol-formaldehyde resin. The thus coated polyester is heated and then incorporated into rubber. However, this system can be unsatisfactory depending on factors such as the degree of polyester heat treatments; the composition of the polyester substrate; the amount of stress and heat the reinforced rubber article undergoes; and the like.

In order to further improve polyester adhesion, polyester filament can be treated during the spin draw process prior to the drawing stage, with a spin finish containing an adhesive activating agent. In actual commercial practice, such adhesive activators, as a general rule, comprise one or more active epoxy compounds, with or without a catalyst. Notable epoxy compounds include butanediol diglycidyl ether, glycerol diglycidyl ether and epoxidized silanes. Such epoxy compounds have been found to greatly increase adhesion of polyester to rubber when used prior to the RFL dip.

Two examples of attempts to improve the adhesion of polyethylene terephthalate filaments to rubber are set forth in U.S. Pat. Nos. 3,297,467 and 3,383,242. In these patents, polyethylene terephthalate filaments are treated with a spin finish which is an aqueous dispersion containing a polyglycidic ether of an acyclic hydrocarbon substituted by at least three hydroxy groups or a diglycidic ether of an aliphatic diol, respectively, in combination with an amine curing agent and a lubricating agent. After heating to fix the ether and amine components, the filaments or cord made therefrom can then be treated with an adhesive such as an RFL latex. U.S. Pat. No. 3,297,468 describes a similar finish except that the polyglycidic ether is of a cyclic hydrocarbon substituted with at least two hydroxy groups.

Another example of an epoxide finish additive which may be employed to promote adhesion between a tire cord and an RFL adhesive is disclosed in U.S. Pat. No. 3,803,035. The finish comprises a lubricating oil, an antistatic agent, an emulsifier and a polyepoxide. Suitable antistatic agents include quaternary ammonium and pyridinium cationic agents.

U.S. Pat. Nos. 3,911,422 and 3,968,304 are directed to a method of bonding polyester tire cords to rubber by use of a two-step process. In the first step, a dip is employed which comprises a low molecular weight polyallyl-glycidyl ether in an aqueous media. In the second step, a dip is employed comprised of an alkaline aqueous dispersion of a rubbery vinyl pyridine copolymer and a heat reactable resinous composition.

U.S. Pat. No. 4,078,115 discloses an adhesive system for bonding polyester filaments to rubber in which a first coating is employed comprised of the reaction product of a polyepoxide and a quaternized copolymer of 4-vinylpyridine and an aminimide. A second coating of an RFL adhesive is also employed.

There continues to be a need for improved adhesive activating systems which can replace or be used in combination with known epoxy spin finishes while achieving superior adhesive results. Any such candidate should fit into existing fiber producing procedures; should have a potlife of sufficient duration that it can be used in the spin draw process; and should be compatible with the RFL dip systems widely used by rubber article manufacturers.

OBJECTS AND SUMMARY OF THE INVENTION

It is a general object of the present invention to meet the need for an improved adhesive activating system.

It is a more specific object of the present invention to provide a composition that can be used to adhesive activate polymeric material, especially polyester material.

It is a further object of the present invention to provide a relatively stable and storable composition that can be used to adhesive activate polymeric material.

It is a still further object of the present invention to provide a composition with a reduced epoxy level which can nonetheless yield acceptable adhesive activation.

It is a still further object of the present invention to provide a composition that can be applied as a spin finish or a top coating in order to adhesive activate polymeric material, especially polyester material.

It is a still further object of the present invention to provide a process for adhesive activating polymeric material, especially polyester material.

It is a still further object of the present invention to provide an adhesive activated polyester material which exhibits improved adhesion to rubber.

It is a yet further object of the present invention to provide an adhesive activated polyester material which exhibits a high level of fatigue resistance and can withstand repeated flexing.

In one aspect, the present invention provides a composition for adhesive activating polymeric material. The composition comprises a non-resinous quaternary ammonium salt of a polyepoxide wherein the nitrogen atom of the ammonium group is bonded directly to a carbon atom of the polyepoxide chain and wherein the composition is substantially free of free amine.

In other aspects, the present invention provides polymeric material bearing the residue of the defined composition, a process of treating polymeric material with an adhesive activating composition and polyethylene terephthalate yarn made by the process.

DETAILED DESCRIPTION OF THE INVENTION

As stated hereinabove, the present invention relates to a composition for adhesive activating polymeric material, especially polyester material. The polyester may be any highly polymeric linear polyester obtained by heating one or more glycols of the series $HO(CH_2)_nOH$ wherein n is greater than 1, but does not exceed 10, with one or more dicarboxylic acid such as naphthalene dicarboxylic acid, 4,4'-diphenyl dicarboxylic acid or preferably terephthalic acid, or an ester forming derivative thereof. Examples of ester forming derivatives of dicarboxylic acids are their aliphatic (including cyclo-aliphatic) and aryl esters and half-esters, their acid halides and their ammonium and amine salts. Examples of glycols are ethylene, trimethylene, tetramethylene, hexamethylene and decamethylene glycols.

Additionally, the polyester may be reacted or blended with compatible compounds or polymers which do not substantially adversely affect the characteristics of the polyester. For example, compounds yielding non-ester linkages can be added into the reaction mixture for the polyester or pigments, fillers, antioxidants, etc. can be blended with the polyester. The preferred polymer for purposes of this invention will be composed of at least 85 percent by weight polyethylene terephthalate and will most preferably be substantially all polyethylene terephthalate.

The material into which the polyester is formed can be any size and configuration amenable to processing which will undergo adhesive activation. The material can therefore be filaments, yarns, cords, fabrics, tapes or films. Preferably, the material is filaments or yarn that is melt spun and quenched, particularly those intended for adhesion to rubber as in the production of tires. Illustrative of such polyester material is multifilament polyethylene terephthalate yarn which is ultimately highly crystalline and highly stressed.

The preparation of such high crystalline and highly stressed yarn is, for example, set forth in U.S. Pat. No. 4,414,169, the content of which is incorporated by reference. An alternate process for preparing multifilament polyethylene terephthalate yarn is set forth in U.S. Pat. No. 4,195,052, the content of which is also incorporated by reference.

The polyester material used in the present invention may or may not be chemically stabilized. Under typical preparation conditions, a polyester, such as polyethylene terephthalate, has a level of carboxyl end groups ranging from about 30 to 40 microequivalents per gram. To obtain chemical stabilization of the polyester, a compound such as ethylene carbonate, phenyl glycidyl ether, or preferably ethylene oxide, is incorporated into the polyester material. For example, ethylene oxide can be added to a polyester melt which is maintained at a pressure of from about 500 to about 5000 psig in accordance with the disclosures of U.S. Pat. Nos. 4,016,142 and 4,442,058, the contents of which are incorporated by reference.

The stabilizing compound is present in an amount sufficient to lower the level of carboxyl end groups in the drawn polyester material to less than about 18, preferably less than about 15 and most preferably about 12 or less microequivalents per gram as determined by dissolving 2 grams of the polyester material (with any finish previously removed) in 50 ml of a 70/30 (w/w) mixture of 0/cresol/chloroform such as available from Reagents, Inc. and titrating against a 0.05N solution of potassium hydroxide. Using an Mettler D1 40 Memotitrator, the end-point can be determined potentiometrically. Of course, other reliable techniques can likewise be used to determine the level of carboxyl end groups in the drawn polyester.

Although the invention is described in terms of the adhesive activating of polyester material, it will be appreciated that other polymers which may be activated by epoxies may likewise be treated. Such polymers include polyamides, especially aromatic polyamides (e.g., Kevlar) and polycarbonates.

The quaternary ammonium salt of a polyepoxide which is used in the present invention can be prepared in any of various ways. The preferred method of preparation involves reacting a polyepoxide with an acid salt of a tertiary or heterocyclic amine. The acid salt of a tertiary or heterocyclic amine is prepared by reacting a strong acid with a nitrogen-containing compound wherein the nitrogen is reactive such as a tertiary or heterocyclic, preferably nuclear aromatic, amine. Examples of tertiary amines include trimethylamine, triethylamine, tripropylamine, dimethylethanolamine, dimethylpropanolamine, dimethylisopropanolamine, triethanolamine, benzyldimethylamine, mixtures thereof and other tertiary tri- or mixed alkyl and/or aralkyl amines wherein the hydrocarbyl moieties can be substituted with any of various moieties which do not interfere with the amine-acid salt formation or the reaction thereof with the polyepoxide as discussed hereinafter. Examples of such moieties include hydroxy, halo, acyl, alkoxy, and mixtures thereof.

Examples of heterocyclic amines include quinoline, N-methyl imidazole, N-methyl pyrazole, pyridine, piperidine, 4,4'-trimethylene-dipyridine, N-methyl piperidine, pyrrole, imidazole, oxazole, thiazole, pyrazole, 3-pyrroline, pyrrolidine, pyrimidine, purine, carbozole and mixtures thereof. Preferred heterocyclic amines include pyridine, 4,4-trimethylene dipyridine, dipyridines, substituted pyridines (except for two bulky groups in the alpha position) and mixtures thereof.

The acid used to form the salt is advantageously a strong mineral acid such as hydrochloric, hydrobromic, hydrofluoric, hydroiodic, sulfuric, phosphoric acid and the like. However, appropriate strong organic acids, for example, acetic, propionic, butyric, lactic acid and the like can also be used. Sufficient acid is reacted with the tertiary or heterocyclic amine to form an amine-acid complex or salt.

The amine-acid salt may then be reacted with a polyepoxide having an epoxy equivalency of greater than 1, typically having an epoxy equivalency from about 1.1 to about 100 and preferably having an epoxy equivalency from about 1.5 to about 5. The weight per epoxide should be less than 1000 and preferably less than 200.

The polyepoxide may be prepared by an acid peroxide reaction with a polyolefin and by reacting an epoxy compound with a compound reactive therewith and which may be converted to the polyepoxide. Exemplary epoxy compounds include epihalohydrins, e.g., epibromohydrin, epichlorohydrin, epiiodohydrin and mixtures thereof, which are the preferred epoxy compounds.

The compound with which the epoxy compound is reacted may be a polyol, a polyether polyol, a polyester polyol, a halogenated polyol or mixtures thereof. Such compounds may be a liquid or a solid and have at least two and preferably at least three hydroxyl groups per molecule. Other groups which do not substantially adversely affect the desired reaction may also be present in the compound. Exemplary compounds include glycerol, sorbitol, heptaglycerol, diglycerol, mannitol, sorbitan, trimethylolethane and mixtures thereof. Preferably, the compound is a polyol derived from a sugar, with the most preferred compound being sorbitol.

Illustrative of the reaction between the epoxy compound and the compound reactive therewith is the reaction between epichlorohydrin and sorbitol. Although not to be construed as limiting, it is believed that the primary hydroxyl groups react first according to the reaction:

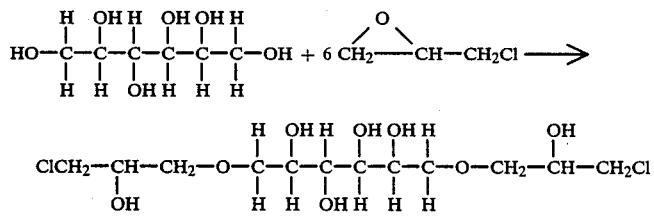

In this intermediate, the secondary hydroxyl groups originating from the epichlorohydrin are believed to be as reactive as the secondary polyol hydroxyl groups and thus the reaction with the remaining four molecules of epichlorohydrin is believed to result in the following compound:

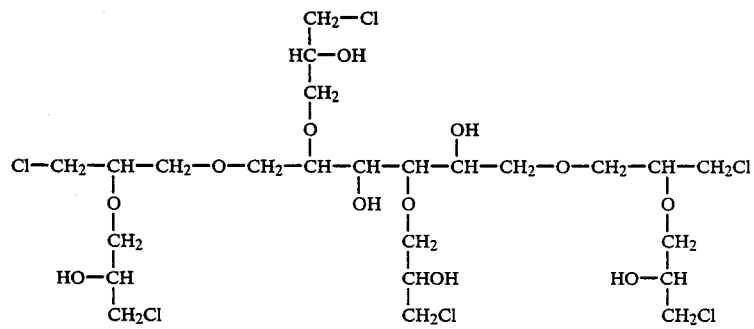

Of course, due to the availability of other available hydroxyl groups, a variety of products may be obtained. However, after the illustrative compound is obtained and possibly after removing sodium chloride and any free epichlorohydrin, the compound is subjected to alkaline conditions (e.g., in the presence of sodium hydroxide) to yield the compound:

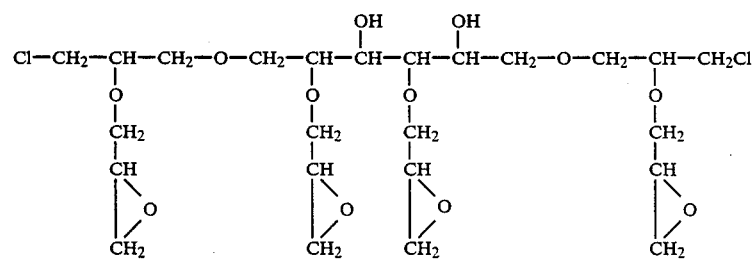

The relative amounts of the epoxy compound and the compound reacted therewith are selected to yield the epoxy equivalency noted above. When the epoxy compound is reacted with a polyol, sufficient epoxy compound is present to react from about 20 to about 100% of the original hydroxyl groups of the polyol, preferably from about 50 to about 100% of the original hydroxyl groups.

As should be apparent to those of ordinary skill in the art, the polyepoxide can be prepared by other techniques known in the art, such as from a compound having a plurality of carbon-to-carbon double bonds. This reaction may proceed as follows:

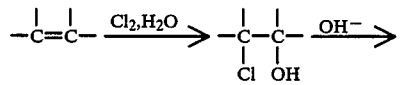

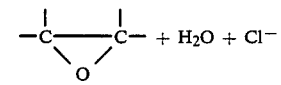

Other polyepoxides such as aromatic epoxides, and silane epoxides, may likewise be employed in the present invention. A further discussion of suitable polyepoxides may be found in U.S. Pat. No. 4,044,189, the contents of which are hereby incorporated by reference.

The reaction between the polyepoxide and the acid salt of the tertiary or heterocyclic amine can proceed by several routes depending primarily on the polyepoxide.

For example, the reaction can involve an epoxide group which is opened by the acid salt as shown below:

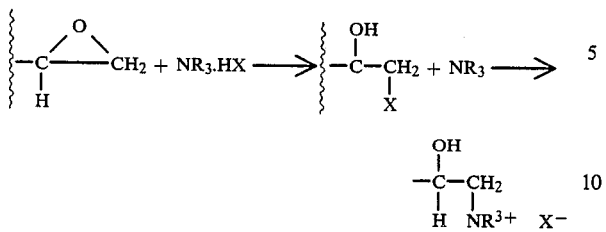

In the above formula, each R can independently represent the same or different hydrocarbyl group as indicated previously or when the three groups are taken together with nitrogen, can represent a hetrocyclic group such as pyridine. $X^-$ represents a strong anion, e.g. chloride.

Although it is preferred that the epoxide group be located in the terminal position, it will be recognized that polyepoxides containing oxirane rings at other locations can be used so long as the steric configuration of the epoxide group and the steric configuration of the acid salt are such that the acid salt can react with the epoxy group.

When the polyepoxide is derived from an epihalohydrin, the polyepoxide will typically contain some amount of terminal halogen, e.g. chlorine, atoms as will be known to those skilled in the art. In such instances it is believed that the quaternary ammonium moiety can also be formed by displacement of the chlorine moiety as shown below:

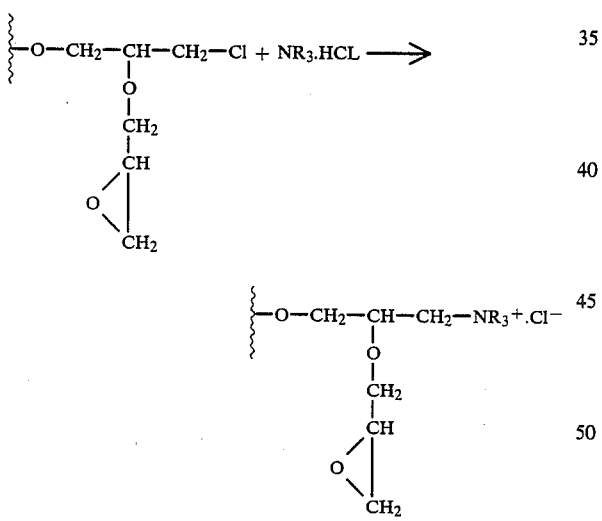

It will be understood that the above reaction is shown for purposes of illustration only and that the oxirane rings shown above may or may not be attacked by the acid salt concurrently with the substitution of the amine for the chlorine.

Additionally, it is noted that when the epoxidized compound contains halogen groups, as above, the quaternary ammonium salt can be fromed simply from the reaction of the tertiary or heterocyclic amine with the halogen-containing epoxy in which case the tertiary or heterocyclic amine will be substituted for the halogen as shown above. However, in such instances the reaction must be carefully controlled as by using minimal concentrations of the amine and controlled temperatures to prevent initiation of rapid polymerization. Thus, for example, the reaction of pyridine with a halogen-containing polyepoxide can be illustrated as follows:

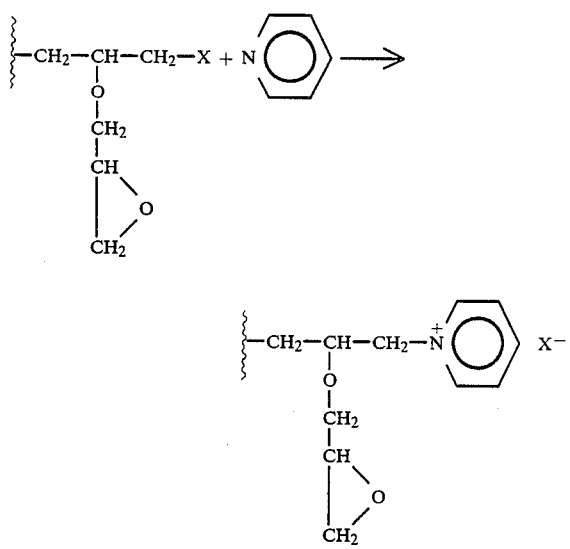

The site at which the nitrogen atom becomes attached to a carbon atom of the polyepoxide chain can also be determined by appropriate selection of the reactants. For example, if the polyepoxide is prepared from epichlorohydrin and the acid salt contains a less reactive anion, such as a bromide ion, the acid salt will preferentially react with the epoxy group in accordance with the following reaction:

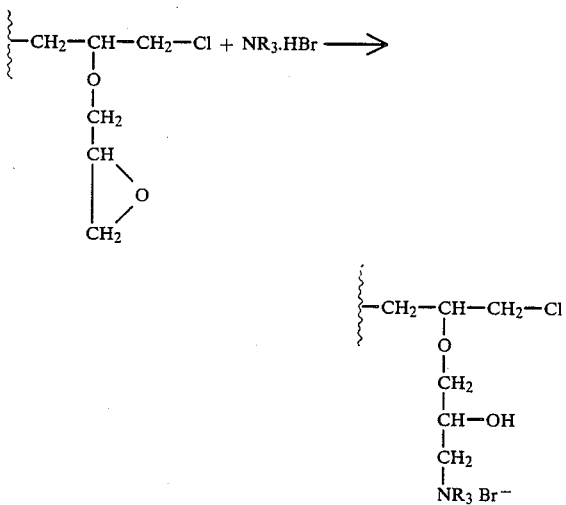

As indicated above, each R can represent the same or different hydrocarbyl groups or together represent a heterocyclic group.

The relative amounts of the reactants is selected such that the equivalent ratio of ammonium groups to epoxy groups in the quaternary ammonium salt is from about 1:1000 to about 1:2, preferably from about 1:50 to about 1:4. The excess of epoxy groups ensures that epoxy groups will exist in the quaternary ammonium salt and helps ensure that the composition used to contact the polyester material is substantially free of free (i.e., unreacted) amine including the salt form thereof.

Still another method for forming the quaternary ammonium-epoxide salt involves the use of a primary or secondary amine-acid salt as a coreactant with the epoxidized compound. In such an instance, the secondary amine can react with two oxirane moieties or the primary amine with three oxirane moieties to form the quaternary ammonium epoxide. Another method is to react the epoxy compound with an acid such as HCl followed by the addition of the free amine. This two step reaction most likely occurs even when the amine salt and epoxy compound are combined in one step.

In any of the reactions used to form the quaternary ammonium salt, care must be taken to avoid [extensive polymerization of the epoxy groups]. Thus, the quaternary ammonium salt is non-resinous as evidenced by its non-solid (e.g., liquid) nature under ambient conditions. To avoid extensive polymerization, high temperatures are avoided in all of the reactions possible for preparing the quaternary ammonium salt. In this regard, since the reactions can involve the opening of oxirane rings which is exothermic in nature, the reactants can be chilled to from about 0° to about 40° C., preferably from about 5 to about 35° and/or the reaction mixture can be maintained in the temperature range of from about 0 to about 40° C., preferably from about 20° to about 30° C.

The reaction need not be conducted under an inert atmosphere, but the reaction is typically performed in a sealed container to avoid a possible loss of volatiles, such as any volatile amine. Where, an acid salt is used in the reaction, sufficient water is used to obtain a homogenous reaction mixture.

Extensive polymerization can also be controlled by diluting the reaction medium with an alcohol, such as ethanol, or an alcohol/water mixture. However, dilution will extend the reaction time which, depending on the reaction conditions, can vary from about 16 to about 48 hours, preferably from about 16 to about 24 hours.

To illustrate the preparation of the quaternary ammonium salt, the following techniques for preparing quaternized sorbitol epoxide are described. Small quantities (e.g., 200 gram batches) of the salt can be prepared by reacting 90 parts by weight of sorbitol epoxide (having a weight per epoxide of 170) and 10 parts by weight of an aqueous solution containing 75% by weight of pyridine hydrochloride. Both reactants are chilled to about 8° C. to ensure that the maximum first hour temperature is about 30 to about 35° C. The reaction mixture is sealed from the atmosphere and maintained at about 20° C. overnight and is then ready for use.

To prepare larger amounts of the quaternized sorbitol epoxide, the reaction mixture can be diluted with ethanol. In this instance, 180 parts by weight of sorbitol epoxide can be mixed with 30 parts by weight of ethanol and then mixed with 20 parts by weight of an aqueous solution containing 75% by weight of pyridine hydrochloride. All reactants are chilled to about 15° C. before being mixed together. The reaction mixture is sealed from the atmosphere and maintained at about 35° C. overnight. After permitting a slightly longer time to account for the dilution of the reaction mixture, the quaternary ammonium salt is ready for use.

In the preferred reaction of a tertiary or heterocyclic amine-acid salt with the polyepoxide, the reaction can be followed by monitoring the temperature of the reaction, viscosity, pH and color. Typically, pH will rapidly decrease, then rapidly increase and then level off after one-half to several hours at a final pH of between 9.0 and 11.0.

In any of the reactions above, it is necessary that the nitrogen atom of the amine be directly bonded to a carbon atom of the poly-epoxide chain. Whether the carbon-nitrogen bond has been achieved can be conveniently determined by examining a small quantity of the reaction product using carbon-13 nuclear magnetic resonance spectroscopy as will be known to those skilled in the art.

The quaternary ammonium salt of the present invention exhibits significant advantageous characteristics in that it may be used after a shorter aging time. Moreover, unlike some compositions which have a relatively short useful life (e.g., from about 3 to about 8 hours) for effectively treating the polyester material, the composition of the present invention can be used up to about 1 week, preferably up to about 3 days after it is prepared. The extended useful life of the composition is in large measure due to the substantial absence of free amine which can catalyze the polymerization reaction. In general, the composition contains less than about 5 preferably less than about 2 and most preferably less than about 1% by weight of free amine.

As mentioned above, the quaternary ammonium salt of the present invention is comparatively stable at room temperature for an extended period of time and retains its fairly low molecular weight. In addition to being non-solid, the quaternary ammonium salt typically has a molecular weight of from about 200 to about 10,000, preferably from about 300 to about 2,000.

The polymeric (e.g., polyester) material can be treated with a composition comprising the quaternary ammonium salt according to various techniques. Specifically, where the polymeric material is to be drawn, it can be treated with the composition before the drawing step. In this instance, the composition can be a spin finish which includes the quaternary ammonium salt and other components common to a spin finish or the composition can be applied separate from a conventional spin finish.

Where the composition contains the quaternary ammonium salt and spin finish components, the composition may be prepared by dissolving the quaternary ammonium salt in a suitable lubricant or by preparing an emulsion of the quaternary ammonium salt and lubricant with water. In this composition, the quaternary ammonium salt will be present in an amount ranging from between about 0.5 to about 50 percent by dry weight, preferably from about 3 to about 15 percent by dry weight. As used herein, the term "dry weight" excludes the presence of water in the determination of the amount of the constituent in the composition.

Lubricants which may be used in the composition are well known to those skilled in the art and include palm oil, coconut oil, cottonseed oil, fatty acid esters, glycerides, polyglycol esters, butyl stearate, octyl stearate, esters of oleic acid, trimethylol propane/caprylic acid esters, 2-methyl propyl-propane diol-1,3-dilaurate and 2-ethyl-2-butyl-propane diallyl-1,3-dilaurate, EO/PO copolymers, polydimethylsiloxanes, pentaerythritol tetra-esters and the like. Additionally, conventional antioxidants such as 4,4'-thiobis(6-tertiary butyl-m-cresol) or 2,2'-methylene bis(4-methyl-6-nonylphenol); emulsifying agents such as ethoxylated sorbitan esters or ethoxylated long chain alcohols and other additives common to spin finishes can be present in the composition. The total amount of solids (i.e., all constituents except water) in the composition typically ranges from about 0.1 to about 1.5% by weight of the composition, preferably from about 0.3 to about 1.0% by weight.

The composition may be contacted with the polymeric material (e.g., industrial yarn) by any suitable means selected primarily according to the form of the material. Such means are, for example, a metered applicator, kiss roll or spray nozzle or the like, in a post quench zone prior to drawing. Sufficient composition is applied to the polymeric material so that from about 0.001 and about 0.5% by weight, based on the weight of the material, of the quaternary ammonium salt is applied to the material. Additionally, it will be recognized that sufficient composition will need to be applied so that the material is sufficiently lubricated for further processing. Preferably, the composition is applied to the material in an amount sufficient to provide between about 0.005 and about 0.4 weight percent of the quaternary ammonium salt on the material, most preferably between about 0.01 and about 0.3 weight percent of the quaternary ammonium salt on the material.

Surprisingly, the polymeric material can also be adhesive activated by the contacting the material after it has been drawn and/or heat set with a topcoat composition comprising the quaternary ammonium salt. In this utility, the composition is comprised of from about 1 to about 100% by dry weight, preferably from about 10 to about 90% by dry weight of the quaternary ammonium salt.

The topcoat composition may further comprise a lubricant, such as butyl stearate, ethoxylated long chain alcohols, ethoxylated polysiloxanes and mixtures thereof, in amounts ranging from about 0 to about 90% by dry weight.

The topcoat composition may also comprise a solvent, such as acetone, butyl carbitol, isopropanol, ethanol and mixtures thereof. The preferred solvent is butyl carbitol which has been found to improve the strength of polyester (i.e., polyethylene terephthalate) cord. The solvent is present in the composition in an amount ranging from about 1 to about 99% by dry weight, preferably from about 5 to about 50% by dry weight. The solvent may also be water in an amount ranging from 1-99%, preferably 50-95% by dry weight. Water is advantageously employed as the solvent for a composition used as a topcoating over drawn yarn or as a spin finish over undrawn yarn.

Other components which may be present in the topcoat composition include tints, fluorescent brighteners, emulsifiers, antifoaming agents, antimicrobial compounds, co-catalysts, flexibilizers such as methacrylates and mixtures thereof. The total amount of solids (i.e., all constituents except water) in the topcoat composition typically ranges from about 1 to about 90% by weight, preferably from about 5 to about 50% by weight.

The topcoat composition can be contacted with the polymeric material using any suitable means which is again selected primarily based on the form of the material. Exemplary means include a metered applicator, a kiss roll, spray or foam and results in an amount of the quaternary ammonium salt of the present invention on the polymeric material ranging from about 0.01 to about 0.6% by weight, preferably from about 0.1 to about 0.4% by weight (based on the weight of the polymeric material). A plurality of contacting means, which may or may not be the same, may also be used.

After being treated with the composition comprised of the quaternary ammonium salt, either before being drawn (e.g., as a spin finish composition) or after being drawn and/or heat set (e.g., as a topcoat composition), the polymeric material may be further processed before being contacted with the adhesive. For example, adhesive activated polyethylene terephthalate yarn may be twisted into cord. Other possible processing steps prior to adhesive application include heating, application of lubricants and other processing aids, tints, etc.

The adhesive which is applied to the adhesive activated polyester material can be any of the known in the art. A particularly useful adhesive is a resorcinol-formaldehyde latex which can be used to adhere polyester material, particular polyethylene terephthalate cord to rubber.

The adhesive resorcinol-formaldehyde latex adhesive can be applied by dipping the adhesive activated polyester material of the invention prior to its incorporation into rubber. The resorcinol-formaldehyde coating is applied in accordance with conventional techniques known to those skilled in the art of bonding polyester material to rubber. It will be recognized that the resorcinol-formaldehyde dip can include other additives commonly employed by those skilled in the art such as, for example, triallylisocyanaurate, blocked isocyanates, active epoxy compositions, and the like. Following application of the resorcinolformaldehyde latex coating, the polyester material will be heated, and a layer of rubber will be applied to and cured on the thusly treated polyester material. The resultant composite will typically then be cured.

By using the quaternary ammonium salt of the present invention, the adhesion of polyester material to rubber may be improved significantly. Particularly notable is the increase in steam aged adhesion which is believed to be a more reliable predictor of long term performance of polyester reinforcement in rubber. Additionally, the adhesive activated polyester material exhibits a high level of fatigue resistance and can withstand repeated flexing.

Due to the improved adhesion obtained by the quaternary ammonium salt of the present invention, a lower level of epoxy compound can be employed to obtain results comparable with known epoxy activating compound. Additionally, since the polymeric material can be treated at various times in the process, greater process flexibility can be obtained and a process can be tailored to obtain a particular result.

The following Examples are given as illustrations of the invention. It should be understood, however, that the invention is not limited to the specific details set forth in the Examples.

EXAMPLE 1

This example illustrates the formation of a tertiary amine-hydrochloride salt. Ninety parts by weight sorbitol epoxide (having a molecular weight of about 630 and an epoxide equivalency of about 170, and prepared from the reaction of sorbitol with epichlorihydrin) were mixed with 7.5 parts by weight pyridine hydrochloride in 2.5 parts water. The mixture was stirred to give a homogenous mixture and was left to react at room temperature. A thermocouple was used to monitor the temperature of the resultant mixture and samples were withdrawn periodically to measure pH, color and viscosity. Results are set forth below:

TABLE 1

| Time from Mixing components (Hours) | Temperature of Mixture (°C.) | pH of* Solution | Color of** Solution | Viscosity of Mixed Component at 25° (cps) |
|---|---|---|---|---|
| 0 | 23 | 2.1 | — | — |
| 0.3 | 32 | — | — | — |
| 1.5 | 27 | 10.1 | 5–6 | 13,600 |
| 3.0 | 25 | 10.3 | 7–8 | 21,700 |
| 5.0 | 24 | 10.4 | 8 | 29,600 |
| 24.0 | 23 | 10.0 | 10–11 | 68,000 |
| 48.0 | 23 | 9.7 | 11–12 | 82,000 |
| Starting Sorbitol epoxide | | 8.6 | 3 | 14,500 |
| Pyridine | | 7 | | |

*pH measured in 50/50 v/v acetone/water as 15% solution
**Color: Gardner scale, measured on a 50% solution in Butyl carbitol.

The results show the formation of a strong base and some polymerization of the epoxide. The high pH is not due to the presence of free pyridine since pyridine is not a strong enough base i.e., in acetone/water, it gave a pH of 7). The above mixture was analyzed by carbon-13 NMR study which showed the presence of a quaternary ammonium species. Together, these results indicate the generation of a quaternary ammonium base.

In preferred embodiments of the invention, the quaternary ammonium epoxide is used after an aging period of 16 to 24 hours. From the above, it can be seen that such reaction product has undergone some degree of polymerization.

EXAMPLE 2

Sorbitol epoxide pyridinium chloride was prepared as above using sufficient pyridinium hydrochloride to provide 5.0 weight percent quat on epoxide. That is, sufficient pyridinium hydrochloride was reacted with the sorbitol epoxide such that 5 weight percent of the epoxide groups in the starting epoxide were reacted with pyridinium hydrochloride. This material was mixed with the following oily components in the following relative amounts to provide an oily fiber finish:
- 60 parts by weight polyalkyleneoxidedimethylsiloxane copolymer (available from Union Carbide as L-7600);
- 25 parts by weight sorbitol epoxide quaternary pyridinium chloride;
- 15 parts by weight polyoxyethylene (10) nonylphenol.

The above was mixed with sufficient water to provide an emulsion having 30 parts by weight (on weight of oil) water.

The resultant finish is applied to a conventional polyester industrial yarn as a spin finish at a location immediately following the convergence point of the yarn and prior to a conventional hot drawing of the yarn. Prepared samples were allowed to age at least two weeks before testing to prevent aging from increasing the variability of the results. The yarns were topcoated with a conventional alkyl fatty acid ester lubricant as a topcoat. The yarns were twisted into a 1000/2 12×12 construction. These greige cords were subsequently treated on a Litzler Computreator using a conventional RFL dip with a two zone treatment;
Zone 1: 350° F./50 secs./+2% stretch
Zone 2: 455° F./70 secs./−1% stretch Physical properties were measured on an Instron tensile tester. Dip pickup (DPU) level was measured by the wet method. Adhesion measurements included conventional H-testing using different types of rubbers and peel testing with still another rubber conventionally used in combination with polyethylene terephthalate tire cord. H-testing was done at room temperature, while peels were pulled at 250° F. and at room temperature after a 1-hour exposure to steam in an autoclave. Test results for the spin finish of this invention are set forth below together with similar tests performed at the same time on a conventional epoxy spin finish adhesive activated polyethylene terephthalate tire yarn (type 811 marketed by Celanese Fibers Marketing Company).

TABLE 2
PHYSICAL PROPERTIES AND ADHESION OF CORDS PREPARED FROM SORBITOL QUAT EPOXIDE FINISHED YARNS

| Treated Cord Physical Properties | Conventional Epoxy Spin Finish | Sorbitol Quat Epoxide |
|---|---|---|
| BS (lbs) | 32.0 | 31.8 |
| $E_B$ (%) | 15.1 | 13.8 |
| BSE ⅓ Rating | 100 | 96 |
| Stiffness Rating | 100 | 170 |
| Adhesion | | |
| ¼″ H-V71 (lbs) | 30.1 | 33.1 |
| ⅜″ H-F50 (lbs) | 26.6 | 30.8 |
| 250° F. Peel PET (lbs/visual) | 19/2.0 | 27/3.0 |
| Initial Adhesion Rating | 100 | 124 |
| 1 Hr. Steam Peel PET(lbs/visual) | 34/1.5 | 47/2.0 |
| Steam Aged Adhesion Rating | 100 | 136 |
| DPU (%) | 4.5 | 4.5 |

EXAMPLE 3

This example compares use of the finish of the invention as an oily (neat) finish and as an emulsion. The finish was prepared as in Example 2 and applied as a spin finish as in Example 2 either in neat form or in emulsion form. Rubber samples were prepared and tested as in Example 2 with the following results.

TABLE 3
EFFECT OF EMULSION VS. NEAT APPLICATION OF SQE FINISH ON TREATED CORD PHYSICAL PROPERTIES AND ADHESION

| Treated Cord Physical Properties | Conventional Epoxy Emulsion Spin Finish | Sorbitol Quat Epoxide Neat | Sorbitol Quat Epoxide Emulsion |
|---|---|---|---|
| BS (lbs) | 32.5 | 31.4 | 28.2 |
| $E_B$ (%) | 14.5 | 14.5 | 12.4 |
| BSE ⅓ Rating | 100 | 96 | 82 |
| Stiffness Rating | 100 | 148 | 152 |
| ¼″ H-V71 | 100 | 107 | 107 |
| ⅜″ H-F50 | 100 | 118 | 114 |
| 250° F. Peel PET | 100 | 98 | 108 |
| Average Initial Adhesion | 100 | 108 | 110 |
| 1 Hr. Steam Peel PET | 100 | 129 | 140 |
| DPU (%) | 5.2 | 5.2 | 5.2 |

EXAMPLE 4

This example demonstrates the relationship between rubber adhesion and quaternary level. Pyridine hydrochloride was reacted with sufficient sorbitol epoxide to provide quaternary levels (based on the weight of epoxy groups) of 0.5%, 1.5%, 5.0% and 15.0%. The quaternary sorbitol epoxide was used to prepare an emulsion finish as in Example 2 and applied to polyester industrial yarn as a spin finish as in Example 2. Physical properties of the yarns were recorded and rubber samples were made with the yarns as in Example 2. The samples were tested and results are set forth below:

TABLE 4
EFFECT OF QUATTING LEVEL ON ADHESION AND PHYSICAL PROPERTIES

| | Conventional Epoxy Finish | Quat Epoxide | | | |
|---|---|---|---|---|---|
| Wt % on Epoxy of Quat | 0 | 0.5 | 1.5 | 5.0 | 15.0 |
| Treated Cord Physical Properties | | | | | |
| BS (lbs) | 32.0 | 31.0 | 30.8 | 31.8 | 32.1 |
| $E_B$ (%) | 15.1 | 14.4 | 14.0 | 13.8 | 13.4 |
| BSE ⅛ Rating | 100 | 95 | 94 | 96 | 96 |
| Stiffness Rating | 100 | 122 | 120 | 170 | 184 |
| ¼" H-V71 | 100 | 104 | 98 | 108 | 108 |
| ⅜" H-F50 | 100 | 103 | 109 | 112 | 103 |
| 250° F. Peel PET | 100 | 93 | 98 | 128 | 122 |
| Initial Adhesion | 100 | 100 | 102 | 116 | 111 |
| 1 Hr. Steam Peel | 100 | 94 | 118 | 172 | 162 |

EXAMPLE 5

Sorbitol quaternary epoxides were prepared from pyridine hydrochloride, piperidine hydrochloride and trimethylamine hydrochloride as in Example 1. Finish compositions were prepared as in Example 2 and were applied to polyester tire yarn as a spin finish as in Example 2. The thus prepared yarns were woven into tire cord and properties of the cord were measured and recorded. Rubber samples were prepared from the cords and tested for physical properties. Results are set forth below:

TABLE 5
EFFECT OF VARYING THE QUATTING AGENT ON PHYSICAL PROPERTIES AND ADHESION

| | Pyridine HCL | Piperdine HCL | Trimethyl-amine/HCL |
|---|---|---|---|
| Treated Cord Physical Properties | | | |
| BS (lbs) | 30.2 | 28.8 | 28.8 |
| $E_B$ (%) | 13.0 | 13.3 | 12.2 |
| BSE ⅛ Rating | 100 | 97 | 94 |
| Stiffness Rating | 100 | 88 | 101 |
| Adhesion | | | |
| ¼"H-6940 (lbs) | 33.2 | 32.4 | 33.0 |
| ⅜"H-F50 (lbs) | 29.2 | 27.9 | 27.4 |
| 250° F. Peel PET Rating | 100 | 89 | 78 |
| Initial Adhesion Rating | 100 | 94 | 90 |
| 1 Hr. Steam Peel PET Rating | 100 | 104 | 101 |

EXAMPLE 6

This example demonstrates the effect on epoxide functionality or number of epoxy groups per molecule on rubber to tire cord adhesion. A series of epoxy compositions were quaternized with pyridine hydrochlorohide to provide a 5% by weight quat on epoxy level. Three straight chain aliphatic epoxides having epoxide functionalities of 2.0, 2.4 and 3.4 epoxy groups per molecule and one bulky backbone epoxide of 2.6 epoxy groups per molecule were quatted. These were incorporated into spin finishes as in Example 2. Polyester yarns were prepared using the spin finishes as in Example 2 and the resultant yarns were woven into tire cord which were evaluated and the physical properties recorded. The cords were used to prepare rubber samples which were tested and the physical properties were recorded. Results are set forth below:

TABLE 6
EFFECT OF THE EPOXIDE FUNCTIONALITY OF ALIPHATIC QUATTED EPOXIDES ON ADHESION AND PHYSICAL PROPERTIES

| | Conventional Epoxy Finish | Sorbitol-Quat Epoxide | Sorbitol-B Quat Epoxide | Glycerol-Quat Epoxide | Trimethylolethane Quat Epoxide |
|---|---|---|---|---|---|
| Epoxide Functionality | 2.0 | 3.4 | 2.4 | 2.0 | 2.6 |
| Treated Cord Physical Properties | | | | | |
| BS (lbs) | 32.1 | 31.1 | 30.6 | 31.6 | 32.3 |
| $E_B$ (%) | 13.1 | 12.7 | 12.3 | 13.4 | 13.0 |
| BSE ⅛ Rating | 100 | 96 | 93 | 99 | 100 |
| Stiffness Rating | 100 | 129 | 116 | 100 | 106 |
| Adhesion | | | | | |
| ¼" H-V71 (lbs) | 28.7 | 30.4 | 32.4 | 31.1 | 26.0 |
| ⅜" H-F50 (lbs) | 26.6 | 30.4 | 27.6 | 26.2 | 22.2 |
| 250° F. Peel PET Rating | 100 | 116 | 98 | 110 | 86 |
| Initial Adhesion Rating | 100 | 112 | 105 | 106 | 87 |
| 1 Hr. Steam Peel PET Rating | 100 | 125 | 112 | 88 | 78 |
| DPU (%) | 5.4 | 5.4 | 5.4 | 5.3 | 5.6 |

The following Examples show the effects of topcoating with a composition containing the quaternary ammonium salt of the present invention. In the Examples, polyethylene terephthalate yarns which have been made by a conventional low birefringence process and which have been drawn and heat set are topcoated with the treating composition using dual, synchronized kiss rolls to obtain a 0.3% quaternized epoxy composition on yarn. The yarns are twisted into a 1000/2 12×12 construction and are subjected to a resorcinol-formaldehyde latex treatment in the manner described with respect to the previous Examples.

EXAMPLE 7

This example illustrates the effects of various parameters in the preparation of quaternary ammonium salt [i.e., sorbitol quaternary epoxide (SQE) prepared by reacting sorbitol polyglycidyl ether and pyridine hydrochloride] on the adhesion, strength and stiffness of treated cords. The parameters examined were:
1. The epoxy number of sorbitol polyglycidyl ether which was 5632 or 5783 microequivalents per gram.
2. The use of 8 or 32 grams of an aqueous solution containing 75% by weight pyridine hydrochloride per 180 grams of sorbitol polyglycidyl ether.
3. The use of 8 or 30 grams of ethanol per 180 grams of sorbitol polyglycidyl ether in the reaction mixture.
4. A reaction temperature of 15° or 35° C.

5. A reaction time of 18 or 48 hours.

The results are compared to a conventional epoxy composition applied at spin draw and are set forth in Table 7. In this example all of the compositions were applied at 0.2 weight percent quaternized epoxy on the fiber.

TABLE 7

SQE TOPCOAT QUARTERIZATION EFFECTS

| | 1/2" H-F50 | 250° F. Peel | 2 Hr. Steamed Peel | BS | $E_B$ | BSE$^{1/2}$ | Stiffness |
|---|---|---|---|---|---|---|---|
| Conventional | 100 (23.3 lbs.) | 100 (33/4.5) | 100 (45/3.6) | 100 (30.49 lbs.) | 100 (16.4) | 100 | 100 (39 g) |
| Conventional | 102 | 106 | 90 | 95 | 91 | 92 | 131 |
| Epoxy 5632 | 104 | 104 | 86 | 98 | 96 | | 122 |
| Number 5783 (meg/g) | 105 | 102 | 85 | 100 | 95 | | 128 |
| Catalyst 32 | 106 | 103 | 84 | 99 | 96 | | 125 |
| Level (g) 8 | 104 | 104 | 87 | 99 | 96 | | 125 |
| Ethanol 30 | 106 | 104 | 85 | 100 | 97 | | 123 |
| Solvent (g) 0 | 103 | 102 | 86 | 99 | 95 | | 127 |
| Reaction 35 | 104 | 103 | 85 | 98 | 96 | | 123 |
| Temp. (°C.) 15 | 105 | 103 | 86 | 100 | 96 | | 127 |
| Reaction 18 | 105 | 103 | 86 | 99 | 96 | | 128 |
| Time (Hrs.) 48 | 105 | 103 | 86 | 99 | | 128 | |
| SQE Mid Points | 105 | 107 | 90 | 98 | 94 | | 127 |
| SQE Avg. | 105 | 103 | 86 | 99 | 96 | | 125 |

EXAMPLE 8

This example illustrates the effects of aging on adhesion, strength and stiffness of cords formed from chemically stabilized yarns (i.e., about 8 c.e.g.) and moderately chemically stabilized yarns (i.e., about 17 c.e.g.). The topcoating composition is composed of 15% by weight of the reaction product of 90 parts by weight of sorbitol polyglycidyl ether and 10 parts by weight of aqueous solution containing 75% by weight of pydridine hydrochloride, 20% by weight of butyl carbitol, 62.75% of deionized water and 2-25% by weight of ethanol. The results are compared with a conventional epoxy spin-draw applied composition and are set forth in Table 8.

TABLE 8

LONG TERM YARN AGING

| Yarn Type | Days Aging | Steam Aged Adhesion | Initial Adhesion | BSE$^{1/2}$ | Stiffness |
|---|---|---|---|---|---|
| Conventional | (fully aged) | 100 | 100 | 100 | 100 |
| Chemically Stabilized Yarn | 21 | 114 | 99 | 94 | 173 |
| | 225 | 94 | 103 | 97 | 120 |
| Moderately Chemically Stabilized Yarn | 21 | 115 | 104 | 94 | 156 |
| | 225 | 102 | 107 | 96 | 127 |

This invention has been described in considerable detail with reference to specific preferred embodiments. However, the variations and modifications can be effected within the spirit and scope of the invention as described in the foregoing specification and defined in the following claims.

What is claimed is:

1. Polymeric polyester material containing on its surface a composition comprising a non-resinous quaternary ammonium salt of a polyepoxide wherein the ammonium moiety is bonded directly to a carbon atom of the polyepoxide chain and wherein the composition is substantially free of free amine whereby the polymeric material is adhesive activated.

2. The polymeric polyester material of claim 1 wherein said material is undrawn yarn.

3. Polymeric polyester yarn containing on its surface a lubricant and a composition comprising a non-resinous quaternary ammonium salt of a polyepoxide wherein the ammonium moiety is bonded directly to a carbon atom of the polyepoxide chain and wherein the composition is substantially free of free amine whereby the polymeric material is adhesive activated.

4. The yarn of claim 3 wherein said quaternary ammonium salt is present in an amount ranging from about 0.5 to about 50% by weight of the total weight of said lubricant and said ammonium salt.

5. The yarn of claim 4 wherein the total concentration of said lubricant and said composition ranges from about 0.1 to about 1.0% by weight of said yarn.

6. The yarn of claim 5 wherein said yarn is polyethylene terephthalate.

7. Polyethylene terephthalate yarn containing on its surface an adhesive, a lubricant and a composition comprising a non-resinous quaternary ammonium salt of a polyepoxide wherein the ammonium moiety is bonded directly to a carbon atom of the polyepoxide chain and wherein the composition is substantially free of free amine whereby the polymeric material is adhesive activated.

8. The yarn of claim 7 wherein said adhesive comprises a resorcinol-formaldehyde latex.

9. The polymeric polyester material of claim 1 wherein said material is drawn yarn.

10. Polymeric polyester yarn containing on its surface a topcoat composition containing a non-resinous quaternary ammonium salt of a polyepoxide wherein the ammonium moiety is bonded directly to a carbon atom of the polyepoxide chain and wherein the composition is substantially free of free amine whereby the polymeric material is adhesive activated.

11. The polymeric polyester yarn of claim 10 wherein the concentration of said quaternary ammonium salt in said composition is from about 0.5 to about 100% by dry weight.

12. The polyester yarn of claim 11 wherein said yarn is polyethylene terephthalate.

* * * * *